(12) United States Patent
Serkh et al.

(10) Patent No.: US 7,758,465 B2
(45) Date of Patent: Jul. 20, 2010

(54) DAMPED PLANETARY TRANSMISSION

(75) Inventors: Alexander Serkh, Troy, MI (US); Peter Alan Ward, Farmington Hills, MI (US)

(73) Assignee: The Gates Corporation, Denver, CO (US)

( * ) Notice: Subject to any disclaimer, the term of this patent is extended or adjusted under 35 U.S.C. 154(b) by 304 days.

(21) Appl. No.: 12/152,146

(22) Filed: May 13, 2008

(65) Prior Publication Data

US 2008/0300098 A1 Dec. 4, 2008

Related U.S. Application Data

(60) Provisional application No. 60/933,103, filed on Jun. 4, 2007.

(51) Int. Cl.
*F16H 3/44* (2006.01)
(52) U.S. Cl. ..................... 475/318
(58) Field of Classification Search ............... 475/318, 475/347
See application file for complete search history.

(56) References Cited

U.S. PATENT DOCUMENTS 4,881,453 A   11/1989   Armstrong ............... 92/84
6,250,276 B1   6/2001   Boll ............... 123/198 R

FOREIGN PATENT DOCUMENTS

| DE | 103 30 870 A1 | 1/2005 |
|---|---|---|
| EP | 0 346 743 A2 | 6/1989 |
| EP | 0 548 955 B1 | 6/1997 |

OTHER PUBLICATIONS

International Search Report and Written Opinion of the International Searching Authority dated Aug. 20, 2008.

*Primary Examiner*—Dirk Wright
(74) *Attorney, Agent, or Firm*—J. A. Thurnau, Esq.; J. L. Mahurin, Esq.; P. N. Dunlap, Esq.

(57) ABSTRACT

A damped planetary transmission comprising an input member, an inertial member connected to the input member, a planetary gear assembly connected to the input member, the planetary gear assembly comprising a carrier member that is directly and fixedly connected to the input member, a brake member engaged with a ring gear of the planetary gear assembly, the planetary gear assembly connected to an output member, a one-way clutch operationally disposed between the input member and the output member, and a vibration isolator directly connected for torque flow between the input member and the one-way clutch.

9 Claims, 6 Drawing Sheets

DAMPED PLANETARY TRANSMISSION

REFERENCE TO RELATED APPLICATIONS

This application claims priority from provisional application Ser. No. 60/933,103 filed Jun. 4, 2007.

FIELD OF THE INVENTION

The invention relates to a damped planetary transmission, and more particularly to a planetary transmission having a vibration isolator directly connected for torque flow between the input member and the one-way clutch.

BACKGROUND OF THE INVENTION

Switchable planetary transmissions are intended to provide adequate power to accessory assemblies, such as an air conditioner compressor and alternator, at engine idling speeds without causing those assemblies to race at high engine speeds, which may cause damage. This makes it possible to guarantee the operation of the vehicle electrical system even if the accessory assembly size might be reduced.

A switchable planetary transmission whose drive provides damping of the torsional vibrations stemming from the crankshaft is known from U.S. Pat. No. 6,250,276 (2001) which discloses a drive mechanism for accessory assemblies of a reciprocating internal combustion engine having a switchable planetary transmission which is positioned concentrically to the crankshaft and is driven by the latter. To prevent the noise- and wear-producing vibrations of the free end of the crankshaft from reaching the planetary transmission, a vibration isolator which functions as a cross-recess coupling is provided between the crankshaft and the planetary transmission. However, the transmission in '276 provides a vibration isolator disposed between the crankshaft and the planetary gear carrier, which adds to the complexity and size of the transmission, which in turn increases the manufacturing costs.

What is needed is a planetary transmission having a vibration isolator directly connected for torque flow between the input member and the one-way clutch. The present invention meets this need.

SUMMARY OF THE INVENTION

The primary aspect of the invention is to provide a vibration isolator directly connected for torque flow between the input member and the one-way clutch.

Other aspects of the invention will be pointed out or made obvious by the following description of the invention and the accompanying drawings.

The invention comprises a damped planetary transmission comprising an input member, an inertial member connected to the input member, a planetary gear assembly connected to the input member, the planetary gear assembly comprising a carrier member that is directly and fixedly connected to the input member, a brake member engaged with a ring gear of the planetary gear assembly, the planetary gear assembly connected to an output member, a one-way clutch operationally disposed between the input member and the output member, and a vibration isolator directly connected for torque flow between the input member and the one-way clutch.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
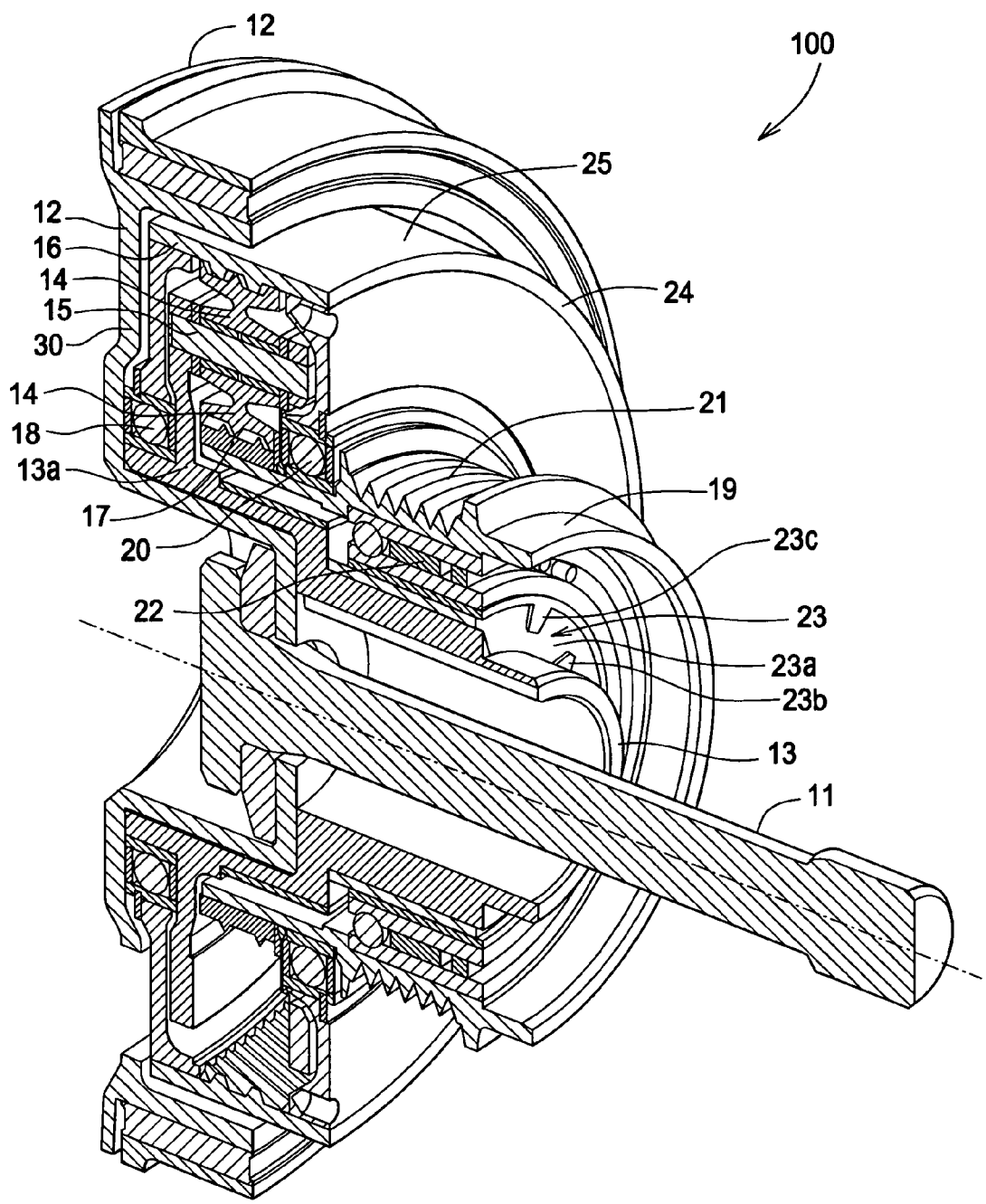
FIG. 1 is a perspective cross section of the transmission.

FIG. 1 is a cross section of the transmission. Transmission 100 is a compact unit which is installed on the end of an internal combustion engine crankshaft.

Transmission 100 comprises input member 13. Input member 13 is connected to an engine crankshaft using a bolt 11. Inertial member 12 is connected to input member 13.

Input member 13 further comprises a carrier member 13a. Input member 13, inertial member 12 and carrier member 13a are connected to form an input assembly. Carrier member 13a is a portion of input member 13.

Disposed about carrier member 13a is a plurality of planetary gears 14. Each planetary gear 14 rotates about a spindle 15.

Disposed radially outward from the carrier member 13a is ring gear 16. Each planetary gear 14 engages ring gear 16 and sun gear 17.

Ring gear 16 rotates about carrier member 13a on bearing 18 and upon output member 19 on bearing 20.

Carrier member 13a, planetary gears 14, spindles 15, and ring gear 16 comprise the planetary gear assembly.

Band brake 24 engages an outer surface 25 of ring gear 16.

Sun gear 17 is disposed on output member 19.

Output member 19 comprises a belt bearing surface 21. Belt bearing surface may have any required profile including multi-ribbed as shown.

One-way clutch 22 is disposed directly between vibration isolator 23 and output member 19. Vibration isolator 23 is disposed directly between one-way clutch 22 and input member 13. This arrangement causes vibration isolator 23 to damp vibrations that would otherwise impact the one-way clutch 22, thereby extending the life of one-way clutch 22. This arrangement does not decouple carrier 13a from crankshaft (CRK) as is taught in the prior art.

The inventive transmission has two operating modes. The first is when the band brake is not engaged. The second is when the band brake is engaged.

First Operating Mode

In the first operating mode, a crankshaft (not shown) rotates input member 13, and therefore carrier member 13a. Inertial member 12 is slaved to the input member 13 and will not be further described.

Since the band brake is not engaged, ring gear 16 is free to rotate.

In this mode one-way clutch 22 is engaged, therefore causing output member 19 to rotate in unison with and at the same speed as input member 13.

Since the subject transmission is connected to a crankshaft of an internal combustion engine through bolt 11, and a drift key not shown, transmission 100 is exposed to the periodic torsional vibrations caused by the periodic firing of each engine cylinder. The torsional vibrations are harmful to the components in the transmission, namely, the one-way clutch 22. The periodic torsional vibrations cause oscillatory velocity changes in the rotational speed of the input member 13.

Vibration isolator 23 comprises an elastomeric member 23a which is compressed between an outer member 23b and an inner member 23c. Vibration isolator 23 and in particular, elastomeric member 23a encircles input member 13. Elastomeric member 23a absorbs the crankshaft torsional vibrations, thereby reducing or eliminating transmission of the torsional vibrations to the one-way clutch 22 and to the output member 19.

Vibration isolator 23 damps torsional vibrations that may be otherwise transmitted through one-way clutch 22, but not through carrier member 13a since the inner member 23b is an integral part of input member 13. In other words, vibration isolator 23 does not damp vibrations transmitted from input member 13 to carrier member 13a. Vibration isolator 23 primarily damps torsional vibrations during the first operating mode, but not during the second operating mode. Vibration isolator 23 is operable to transmit a torque from input member 13 to output member 19 when one-way clutch 22 is engaged.

In the first operating mode the torque flow is from input member 13, directly through vibration isolator 23, through one-way clutch 22 and then through output member 19 to a belt (not shown).

Second Operating Mode

In the second operating mode band brake 24 is engaged. This prevents ring gear 16 from rotating. When ring gear 16 is locked, rotation of carrier member 13a causes each planetary gear 14 to rotate about each respective spindle 15. Rotation of each planetary gear 14 causes sun gear 17 to be driven in the same rotational direction as the input member 13, but at a greater speed having a ratio of approximately 2:1. Since sun gear 17 and output member 19 are being driven at a greater speed than input member 13, one-way clutch 22 is overridden and disengages.

Vibration isolator 23 damps torsional vibration as described.

In the second operating mode the torque flow is from input member 13 (and thereby through carrier member 13a) through planetary gears 14, through sun gear 17 to output carrier 19. Since one-way clutch 22 is disengaged, there is no torque transmitted through one-way clutch 22. Consequently, vibration isolator 23 does not damp torsional vibrations in the second operating mode. Torsional crankshaft vibrations are damped by inertial member 12 in the second operating mode.

Figure 2:
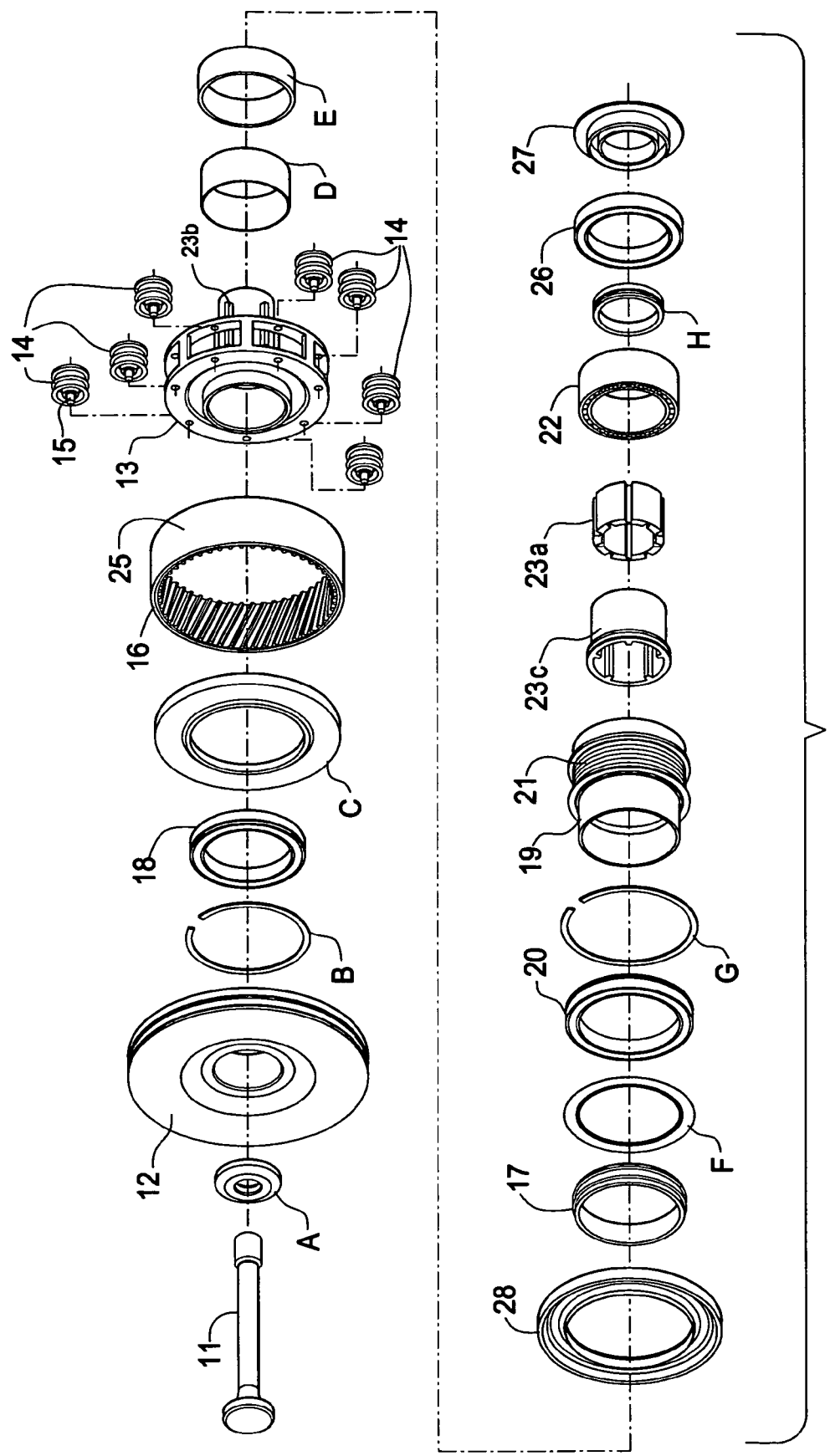
FIG. 2 is an exploded view of the transmission.

FIG. 2 is an exploded view of the transmission. Snap rings B and G are known in the art. Seals F and H prevent debris from entering the transmission. Sleeves D and E act as seals and bearing surfaces between the rotating parts. Collar A is used to locate bolt 11 within input member 13. Bolt 11 is disposed coaxially with the axis of rotation of the transmission. Seal C prevents debris from entering the transmission.

Figure 3:
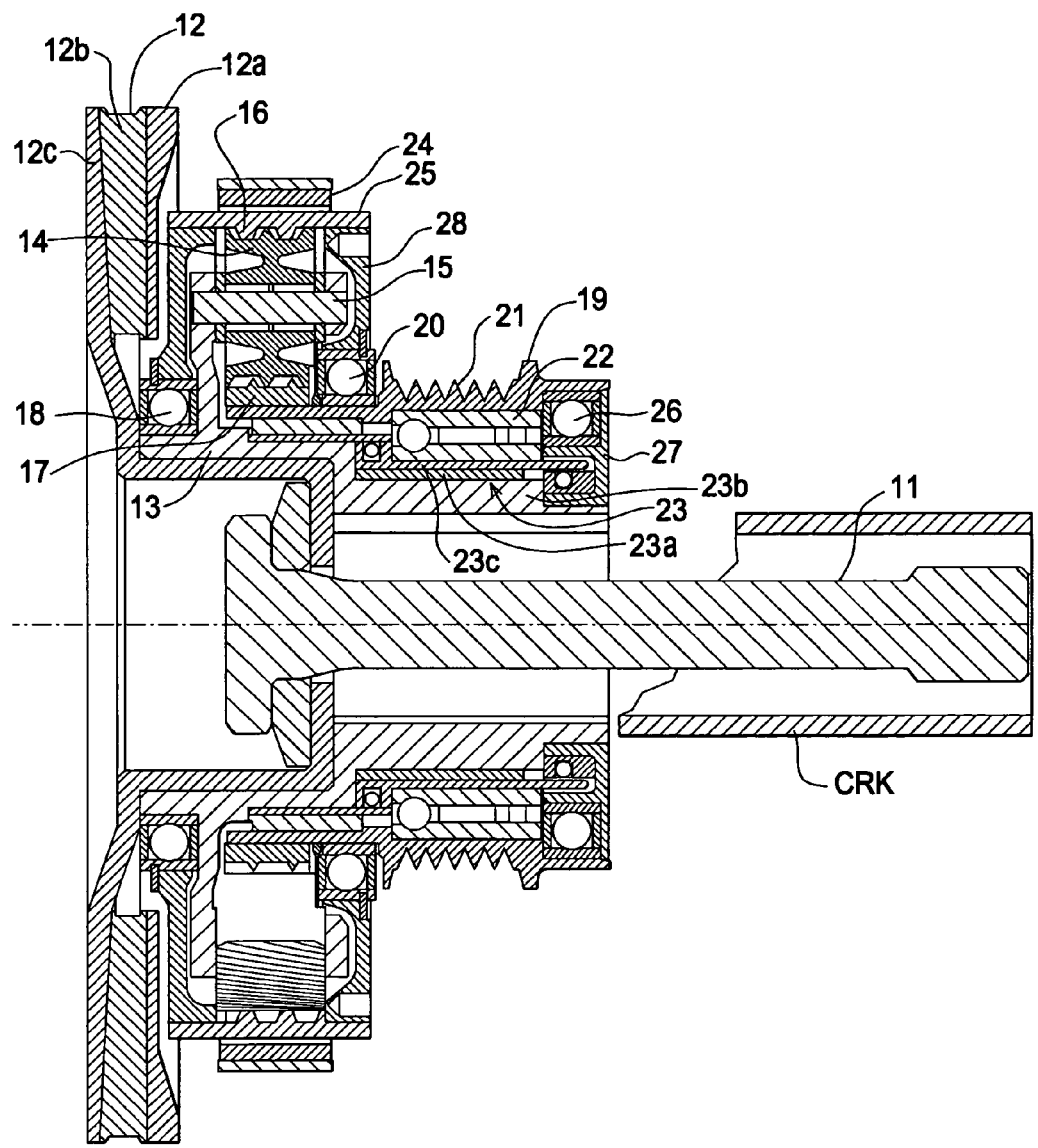
FIG. 3 is a cross section of the transmission.

FIG. 3 is a cross section of the transmission. Output member 19 rotates on bearing 26. Bearing 26 is disposed between input member 13 and output member 19.

Inertial member 12 damps torsional vibrations of the crankshaft CRK. Inertial member 12 is known in the art and generally comprises a mass 12a which is connected to a plate 12c through a compliant member 12b. Compliant member 12b generally comprises an elastic polymer material such as a natural rubber or synthetic rubber or a combination thereof.

In this FIG. 3 the inertial member 12 is shown as an alternate embodiment to the inertial member 12 shown in FIG. 1. The only difference between the two embodiments is that in FIG. 1 the member extends substantially axially and in FIG. 3 the member extends substantially radially, each with respect to the axis of rotation of the transmission. Each embodiment functions equally well and either may be selected according to the operating conditions of the engine on which it is installed.

Band brake band 24 engages surface 25 of ring gear 16. Band brake may comprise one known in the art. For example, the band brake disclosed in U.S. Pat. No. 4,881,453 which is incorporated herein by reference in its entirety.

Portions 27, 28 and 30 prevent debris from entering the transmission, and also provide structural support.

Figure 4:
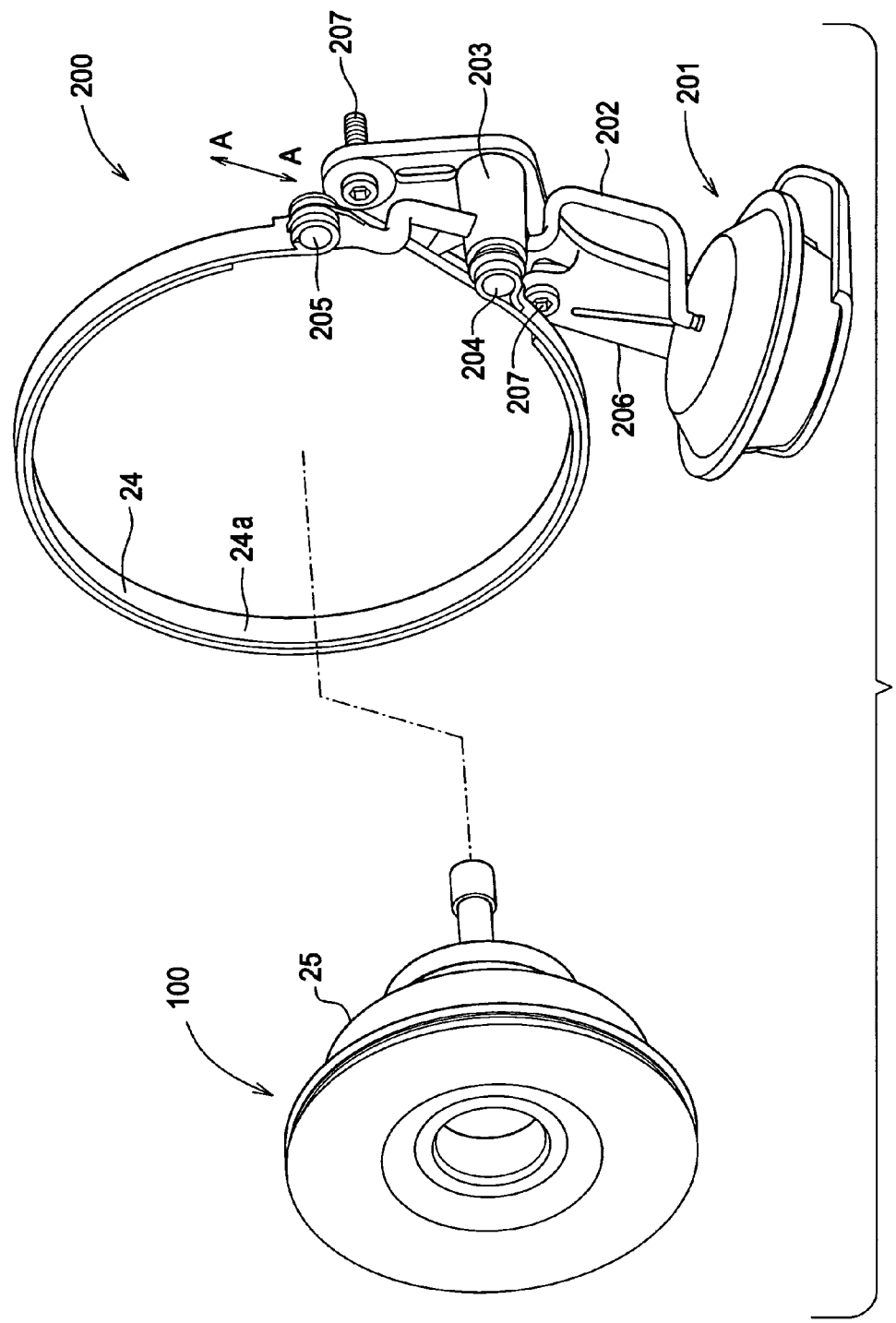
FIG. 4 is a perspective view of the transmission and the band brake.

FIG. 4 is a perspective view of the transmission and the band brake. Band 24 of band brake 200 engages surface 25 of ring gear 16. Band comprises friction material 24a.

Band brake 200 is operated by a vacuum actuator 201. Vacuum actuator 201 is connected to band 24 by linkage 202. Linkage 202 is guided by guide member 203. Guide member 203 restricts linkage 202 such that linkage 202 moves in a substantially linear direction along its major axis A-A. Band 24 is connected at a first pivot 204 to the base 206. Band 24 is connected to a second pivot 205 on an end of linkage 202.

Linear movement of linkage 202 causes second pivot 205 to tightly engage surface 25. Without guide member 203 second pivot 205 can be pushed radially outward by surface 25 during operation, which in turn can diminish the effectiveness of the band brake.

Base 206 of band brake 200 is mounted to a mounting surface, such as an engine, using bolts 207.

Vacuum actuator 201 is connected to a vehicle vacuum system and is controlled based upon the engine speed.

Figure 5:
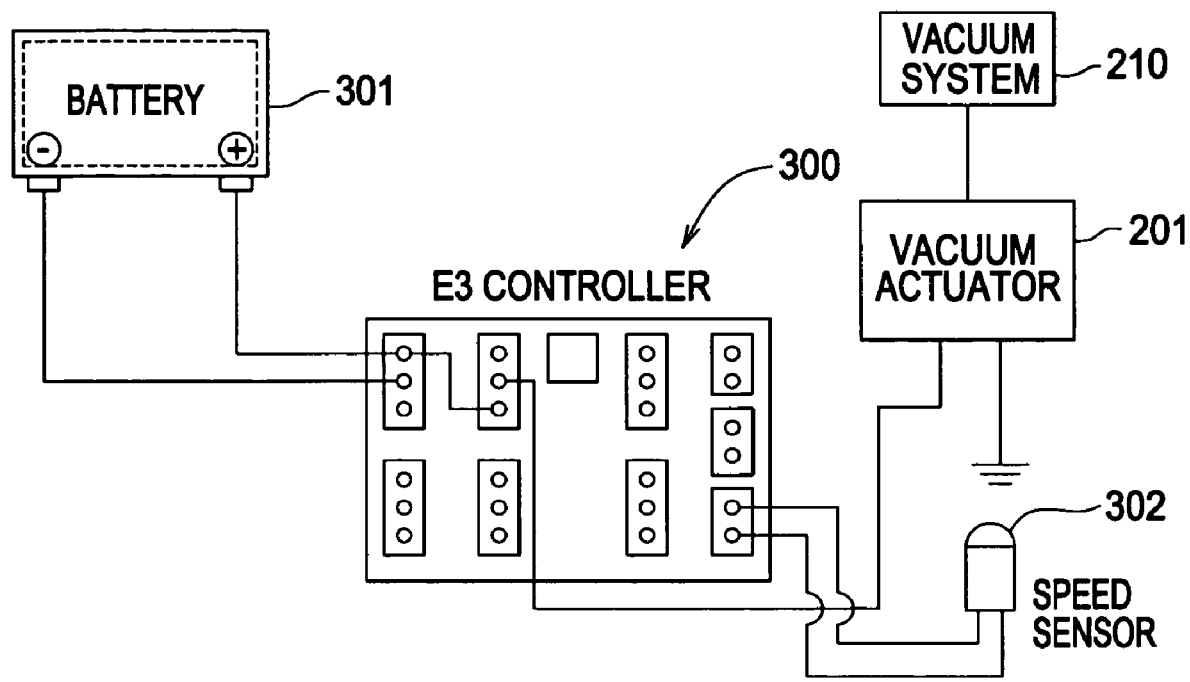
FIG. 5 is a schematic of the control system for the transmission.

FIG. 5 is a schematic of the control system for the transmission. Vacuum actuator 201 is connected to a vehicle vacuum system 210. Vacuum actuator is also connected to E3 controller 300, known in the art. E3 controller 300 is connected to a vehicle battery 301.

Speed sensor 302 provides an engine speed signal to the E3 controller. The E3 controller can be programmed to actuate the vacuum actuator 201 based upon predetermined engine speeds. For example, at engine idle the band brake is "ON" and therefore the vacuum actuator is "ON" and the band 24 is engaged with surface 25. This stops rotation of ring gear 16. This causes the output member 19 to rotate at a speed greater than the speed of input member 13. This causes the accessories to be driven at an appropriate speed at engine idle. Engine idle is typically ~700 RPM to 900 RPM. The transmission ratio is typically in the range of approximately 2:1.

At speeds greater that ~2000 RPM the vacuum actuator is "OFF" which allows ring gear 16 to rotate. The engine speed signal is from speed sensor 302. Rotation of ring gear 16 causes output member 19 to rotate at the same speed as the input member 13. However, due to the smaller radius of output member 19, the accessories are driven at a normally slower speed, thereby reducing the amount of power normally required to run the accessories at higher engine speeds. The diameter of output member 19 is typically ~90 mm. By comparison, the typical diameter of a crankshaft pulley is in the range of approximately 150 mm to 175 mm.

Figure 6:
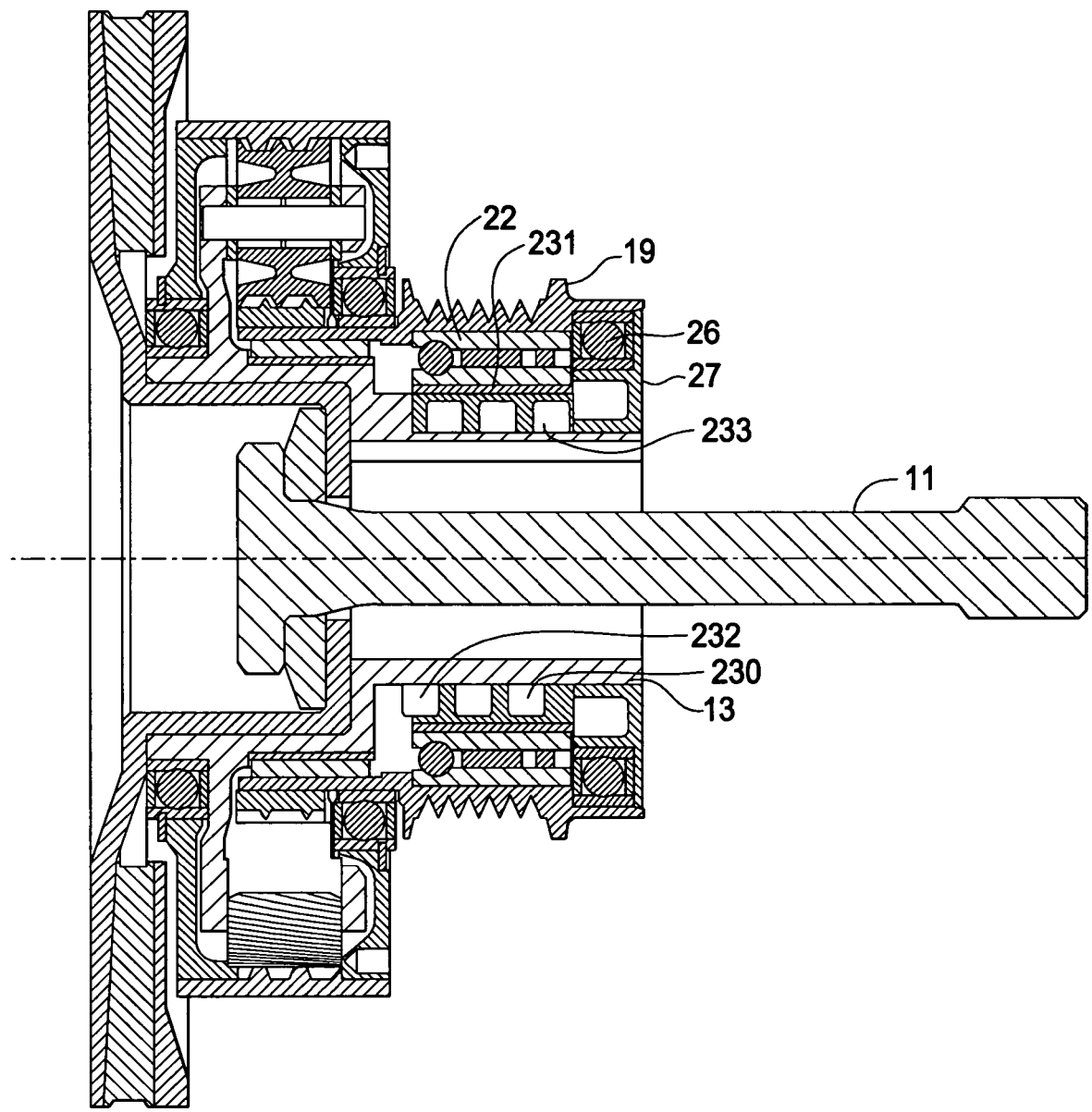
FIG. 6 is a cross section of the transmission.

FIG. 6 is a cross section of the transmission. In this alternate embodiment, vibration isolator 230 comprises a torsion spring instead of elastomeric material. The torsion spring is connected at one end 232 to input member 13 and at the other end 233 to sleeve 231. Sleeve 231 has a non-sliding engagement with one-way clutch 22. Vibration isolator 230 damps torsional vibrations by winding and unwinding oscillations of the spring. The damping rate of vibration isolator 230 is a function its torsional spring rate.

Although forms of the invention has been described herein, it will be obvious to those skilled in the art that variations may be made in the construction and relation of parts and method without departing from the spirit and scope of the invention described herein.

We claim:

1. A damped planetary transmission comprising:
an input member;
an inertial member connected to the input member;
a planetary gear assembly connected to the input member, the planetary gear assembly comprising a carrier member that is directly and fixedly connected to the input member;
a brake member engaged with a ring gear of the planetary gear assembly;
the planetary gear assembly connected to an output member;
a one-way clutch operationally disposed between the input member and the output member; and
a vibration isolator directly connected for torque flow between the input member and the one-way clutch.

2. The damped planetary transmission as in claim 1, wherein the vibration isolator is operable to transmit a torque from the input member to the output member when the one-way clutch is engaged.

3. The damped planetary transmission as in claim 1, wherein the planetary gear assembly comprises a sun gear fixedly connected to the output member.

4. The damped planetary transmission as in claim 1, wherein the brake member comprises:
a vacuum actuator having a linkage connected to a band end;
a guide member engaged with the linkage whereby a movement of the band end is substantially linear; and
the brake member is controlled by a controller using an engine speed.

5. The damped planetary transmission as in claim 1, wherein the vibration isolator comprises a torsion spring.

6. The damped planetary transmission as in claim 1, wherein the vibration isolator comprises an elastomeric member.

7. The damped planetary transmission as in claim 1, wherein the output member comprises a pulley.

8. The damped planetary transmission as in claim 1, wherein the input member is connected to an engine crankshaft.

9. The damped planetary transmission as in claim 1, wherein the inertial member comprises an elastic portion.

* * * * *